United States Patent [19]

Miller

[11] Patent Number: 4,588,567

[45] Date of Patent: May 13, 1986

[54] RECOVERY OF CONCENTRATED $H_2S$ FROM $SO_2$ CONTAINED IN FLUE GAS

[76] Inventor: Ralph Miller, 5 Laurel Hill Dr., Pleasantville, N.Y. 10570

[21] Appl. No.: 695,634

[22] Filed: Jan. 28, 1985

[51] Int. Cl.[4] ............... C01B 17/00; C01B 31/20; C01B 17/60

[52] U.S. Cl. ................................. 423/242; 423/428; 423/438; 423/563

[58] Field of Search .............. 423/242 A, 242 R, 563, 423/428, 437, 438, 512 A; 55/73 US

[56] References Cited

U.S. PATENT DOCUMENTS

| | | | |
|---|---|---|---|
| 651,569 | 6/1900 | Howard | 423/438 |
| 3,542,511 | 11/1970 | Shah | 423/242 |
| 4,141,961 | 2/1979 | Miller | 423/563 |
| 4,340,572 | 7/1982 | Ben-Shmuel et al. | 423/242 |

FOREIGN PATENT DOCUMENTS 2347626  4/1975  Fed. Rep. of Germany ...... 423/242

*Primary Examiner*—Gregory A. Heller

[57] ABSTRACT

This invention is a regenerable process for producing gaseous hydrogen sulfide in concentrated form from sulfur dioxide obtained from a dilute gas source by (1) reacting the $SO_2$ with a concentrated solution of $Na_2SO_3$ to form $Na_2S_2O_5$ in solution and then either: (2) reacting the $Na_2S_2O_5$ with $Na_2CO_3$ to form solid $Na_2SO_3$, a concentrated solution of $Na_2SO_3$ which is recycled to the $SO_2$ reaction and concentrated gaseous $CO_3$ which is used in a subsequent step, (3) reducing the $Na_2SO_3$ to $Na_2S$, (4) reacting the $Na_2S$ with solid $NaHCO_3$ to form gaseous $H_2S$ and $Na_2CO_3$, (5) recycling part of the $Na_2CO_3$ to (2) above and reacting the remainder with concentrated $CO_2$ from (2) above to form solid $NaHCO_3$ and recycling the solid $NaHCO_3$ to (4) above, or; (2) reacting the $Na_2S_2O_5$ with $NaHCO_3$ to form solid $Na_2SO_3$, a concentrated solution of $Na_2SO_3$ which is recycled to the $SO_2$ reaction, and concentrated, gaseous $CO_2$ which is used in a subsequent step, (3A) reducing the $Na_2SO_3$ to $Na_2S$, (4A) reacting the $Na_2S$ in solution with water and gaseous $CO_2$ from (2A) above to form gaseous $H_2S$ and solid $NaHCO_3$ and (5A) recycling the solid $NaHCO_3$ to (2A) above.

10 Claims, 2 Drawing Figures

RECOVERY OF CONCENTRATED H₂S FROM SO₂ CONTAINED IN FLUE GAS

BACKGROUND OF THE INVENTION

This invention is concerned with the conversion to H$_2$S as a concentrated gas from SO$_2$ initially contained in a gas mixture. Although this invention is useful in a variety of circumstances it is of especial utility in flue gas desulfurization—FGD.

It has long been known that when present in the atmosphere even in small concentrations, sulfur dioxide is detrimental to the well-being of animal, aquatic and plant life. When converted to sulfuric acid by the oxygen and moisture in the air, which conversion takes place readily, sulfur dioxide is responsible for the corrosion of many materials of construction including steel and concrete.

Putting large amounts of SO$_2$ into the air from fuel burning installations was prohibited in 1967. In that year Congress passed the Clean Air Act and amended it in 1970. As a result of this legislation the Environmental Protection Agency—EPA—has established standards which limits the emission of the principal pollutants contained in flue gas. These pollutants are particulates, sulfur dioxide and nitrogen oxides measured as nitrogen dioxide. Some of these standards are shown in Table I.

TABLE I

Standards of Performance for New Fossil-Fired Steam Generators (Construction Commenced After August 17, 1971) Fuel Type-Maximum Quantity of Pollutants Permitted in Flue-Gas

| | Pounds/Million BTU | | |
|---|---|---|---|
| | Particulates | Sulfur Oxides | Nitrogen Oxides |
| Solid | .10 | 1.2 | .70 |
| Liquid | .10 | .8 | .30 |
| Gas | — | — | .20 |

The bulk of our heavy duty fuels i.e. bituminous coal and residual fuel oil contain appreciable percentages of sulfur—many containing more than 3% by weight. From the above figures it is evident that when 12,000 BTU per pound coal containing 0.8% sulfur is burned, the limits set by the EPA will be exceeded. To operate within EPA limits, installations burning large tonnages of economically priced fuel have had to resort to scrubbers to remove a large part of the SO$_2$ contained in the flue gas leaving their combustion zones. Most of these scrubbers use lime or limestone directly or indirectly to combine with the SO$_2$ scrubbed out of the flue gas. The chief virtue of this practice is that the pollutant formed, a sludge composed mainly of calcium sulfite and calcium sulfate, is less objectionable than SO$_2$ in air. These sludges are being impounded except where local circumstances allow them to be used as land-fill. When SO$_2$ is scrubbed out of flue gas by a calcium compound, the resulting substance usually becomes a waste disposal problem. Disposing of this waste is a continuing source of expense in addition to the cost of the calcium compound consumed in the operation.

BACKGROUND OF THE PRIOR ART

Since the promulgation by the EPA of the above standards, a large number of flue gas desulfurization processes have been described and an appreciable number of those described put into commercial practice. Of those described previously that described in U.S. Pat. No. 4,141,961 is closest to the process which constitutes this invention.

Most fuels, solid and liquid, contain small amounts of nitrogen-containing compounds. When these fuels are burned, the nitrogen appears in the flue gas principally as nitrogen oxide—NO. In addition, at the high temperatures reached in many boilers, small amount of NO are formed from nitrogen and oxygen in accordance with the overall reaction:

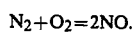

It would be highly desirable to be able to use a scrubbing system which will scrub out the oxides of nitrogen as well as the SO$_2$. It is much easier to scrub NO$_2$ out of a gas stream with an aqueous scrub liquor than NO. Although the reaction is relatively slow, at moderate temperatures NO and oxygen combine to form NO$_2$. The reaction is

In the preferred method of using this invention much of the NO in the flue gas has the opportunity to be converted to NO$_2$. Fortuitously, the scrub liquor used in this invention to scrub out SO$_2$ is also an effective NO$_2$ absorbent.

Many of the absorbents used to scrub SO$_2$ out of flue gas form slightly soluble compounds. As a result, the equipment used to effect the contact between gas and absorbent becomes covered with scale. The scale formed causes operational difficulties necessitating shutdowns and the incurring of excessive maintenance costs.

The manner in which the flue gas is contacted by the aqueous SO$_2$ absorbent is such that the bulk of those particulates which are suspended in the flue gas are captured during the contacting step.

Although the process described in U.S. Pat. No. 4,141,961 is technically feasible, it has been found that it contains a variety of drawbacks which makes it less attractive than is desirable. The present invention although superficially similar to that described in U.S. Pat. No. 4,141,961 employs fundamentally different process concepts.

Most operating FGD scrubbers circulate slurries as the SO$_2$ absorbent. Compared with circulating solids-free liquid absorbents, circulating slurries requires more expensive pumps, taller absorbent towers and inefficient tower internals. In many instances to avoid complications no internals are used within the towers. When no tower internals are used, contacting is obtained by pumping the absorbent into the tower through expensive abrasion resistant nozzles employing high pressure drops to generate a multiplicity of finely divided sprays to secure the required very high liquid-gas interfacial area. These draw-backs are obviated by using an absorbent of high SO$_2$ carrying capacity which is free from these complications. It is an object of this invention to use an absorbent of this kind i.e. it has a high SO$_2$ carrying capacity, is a low-viscosity aqueous liquid, forms a product which is very soluble in water and is readily regenerated by a unique succeeding step in the process.

A second object of this invention to use an absorbent, which in combination with the other steps of the invention not only allows particulates to be captured but the particulates cause no operating difficulties. The manner in which the particulates are handled varies with their concentration in the gas whose $SO_2$ content is to be diminished.

A further object of this invention is to convert to $H_2S$ in the form of a concentrated $H_2S$ gas, the $SO_2$ scrubbed out of an $SO_2$-containing gas mixture.

A further object of this invention is to scrub $SO_2$ out of a gas mixture with an absorbent which has both a strong affinity for $SO_2$ and is completely regenerable by carrying out the subsequent steps of the process.

A further object of this invention is to scrub $SO_2$ out of a gas mixture employing an absorbent which is completely regenerable even though a significant fraction of the sulfite is oxidized to sulfate during the time the scrub solution is in the scrubbing zone.

A further object of this invention is to obtain a spent absorbent at a relatively elevated temperature level—a level such that some of its energy can be recovered. This is particularly important when the invention is used to scrub $SO_2$ out of the flue gas emanating from large power plants.

An especially important objective of this invention is to attain its objectives while incurring a minimum of expense for the evaporation of water.

The above objectives and advantages and additional ones described below are attained by employing a series of chemical reactions in a novel sequence.

SUMMARY OF THE INVENTION

The principal reactions which are employed in this invention are:

$$Na_2S_2O_3 + SO_2 = Na_2S_2O_5 \qquad A$$

$$Na_2S_2O_5 + Na_2CO_3 = 2Na_2SO_3 + CO_2 \qquad B$$

$$Na_2SO_3 + 3C = 3CO + Na_2S \qquad C$$

$$CO + \tfrac{1}{2}O_2 = CO_2 \qquad D$$

$$Na_2S + 2NaHCO_3 = H_2S + 2Na_2CO_3 \qquad E$$

$$Na_2CO_3 + CO_2 + H_2O = 2NaHCO_3 \qquad F$$

When the $H_2S$ whose economic formation is the fundamental objective of the invention is converted to sulfur by means of the Claus process, two additional reactions are employed.

$$H_2S + \tfrac{1}{2}O_2 = H_2O + S \qquad G$$

$$H_2S + Na_2S = 2NaHS \qquad H$$

Reaction A is employed in the $SO_2$ absorption step. The absorbent is a substantially saturated solution of $Na_2SO_3$. In some instances the absorbent contains a small amount of dissolved $Na_2CO_3$. Although the reaction between $Na_2SO_3$ and $SO_2$ is preferably written as shown in Reaction A it can also be written:

$$Na_2SO_3 + SO_2 + H_2O = 2NaHSO_3 \qquad I$$

This solution leaves the $SO_2$ absorption step at a temperature which in many instances is in the neighborhood of 130° F. $SO_2$-containing flue gas emanating from large power plants leave the air preheaters at temperatures not lower than about 280° F.—i.e. above a dew point at which corrosive amounts of $H_2SO_4$ condense. On contact with the aqueous absorbent which is at a lower temperature, the gas simultaneously is cooled and becomes saturated with water vapor. The evaporation of water cools the liquid from which it escapes. The temperature of the solution can only rise to a level such that any additional heat input from the unsaturated gas causes additional water to vaporize without additional increase in the solution's temperature.

In most instances the water content of hot flue gases is such that the temperature of the cooler aqueous absorbent rises to a temperature level between about 120° F. and 135° F. A large quantity of an aqueous non-corrosive solution in this temperature range can become a source of useful energy. Although it has always been apparent that much of the heat in the flue gas was wasted there has been no previous description of how to recover it at very little cost and without complicated equipment. The method of scrubbing $SO_2$ from flue gas used in this invention makes it possible to recover much of this energy economically by the procedure described below.

Reaction B simultaneously regenerates the absorbent which is a substantially saturated solution of sodium sulfite, and further concentrates the absorbed $SO_2$ in the form of solid sodium sulfite. In addition Reaction B provides a concentrated source of $CO_2$ used very effectively later in the process.

Reaction C converts the solid sodium sulfite formed in the preceding step to sodium sulfide—in essence it reduces the $SO_2$ to sulfide. This is accomplished at the expense of the consumption of a reducing agent. Carbon and hydrogen in the form of bituminous coal is the usual reducing agent employed. It is also possible to use gaseous hydrogen if it is readily available, or petroleum coke or hydrocarbon gases. This is a high temperature reaction which is well known. Reaction C as written above is used as a short-hand way of describing the reduction of sodium sulfite to sodium sulfide.

Reaction D indicates some of the CO is converted to $CO_2$ in the process. The reaction of $Na_2SO_3$ with bituminous coal forms sodium sulfide, water vapor and a mixture of CO and $CO_2$. The CO is burned in part or wholly in the equipment used to carry out the reduction step. The heat evolved brings the temperature of the mixture of $Na_2SO_3$ and solid reductant to a temperature of about 800° C., a temperature at which the reaction can go substantially to completion in a reasonable time—not more than about sixty (60) minutes.

Reaction E shows how $H_2S$ is formed by the reaction between $Na_2S$ and $NaHCO_3$ with the concomitant formation of $Na_2CO_3$. The reaction is carried out in a novel manner that affords advantages compared with previously described procedures.

Reaction F shows the reformation of $NaHCO_3$ from $Na_2CO_3$, $H_2O$ and $CO_2$. Although this reaction is well known, the reaction is accomplished in this process more readily and with less elaborate equipment than is required when all of the $CO_2$ is obtained from a relatively dilute source of $CO_2$. In this process most of the $CO_2$ is obtained as a very concentrated gas from Reaction B. thereby achieving substantial economies.

Reaction G is the well known Claus reaction in oversimplified form. A characteristic of the Claus reaction is that it is an equilibrium reaction whose equilibrium constant is such that it is not economically feasible to have it go to more than about 95% to 96% completion. The remaining $H_2S$ must be further processed at a cost which previously was unduly high for the amount of $H_2S$ processed.

Reaction H is a means of economically recovering the H₂S from the tail gas of a Claus process unit, and subsequently recovering it as sulfur as part of a Claus process operation. This is accomplished by incorporating this H₂S absorption step into this invention.

Certain unique aspects of this invention can only be made clear by a detailed description. These details further illustrate the many differences between the present process and that disclosed in U.S. Pat. No. 4,141,961.

BRIEF DESCRIPTION OF THE DRAWINGS

FIG. I is a flow diagram which shows the relationship of the various steps in the process to each other. Included is the integration of the recovery of the H₂S in the tail gas from a Claus process unit with the invention. It will be shown below that the principal parts of one variation of the invention as depicted in FIG. 1 are represented in:

(a) Equipment items 1 through 17 which represent the absorption of $SO_2$ the recovery of energy from the absorbent and the regeneration of the absorbent solution:

(b) Equipment items 18 through 28 and 52 through 55 represent the reduction of $Na_2SO_3$ to $Na_2S$ and the elimination of inert ash from the process.

(c) Equipment items 29 through 39 which represent the formation of $Na_2CO_3$ and $H_2S$ and its conversion to sulfur; and (d) Equipment items 40 through 51 which represent the formation of $NaHCO_3$.

Figure 1:
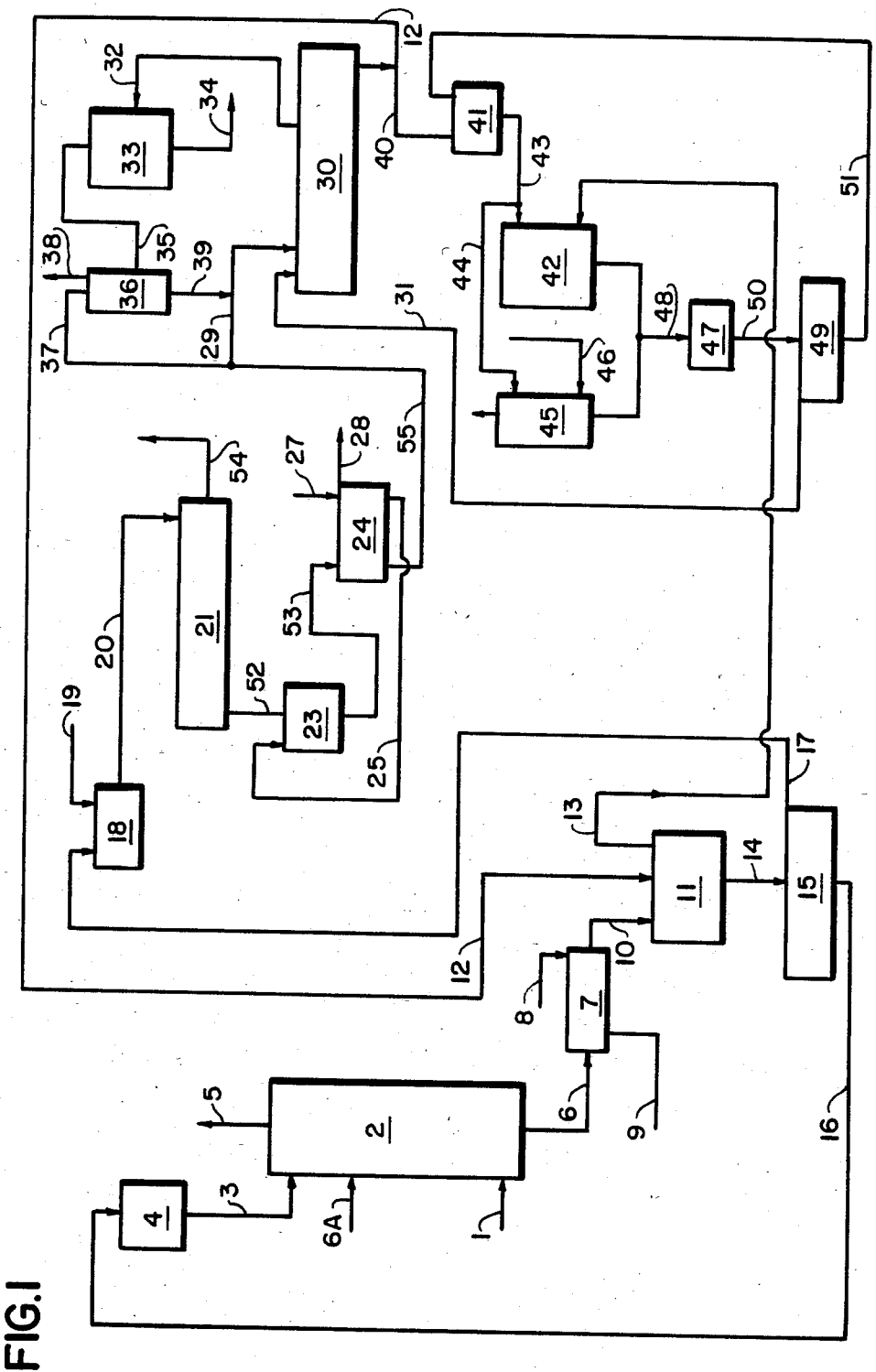
Figure 2:
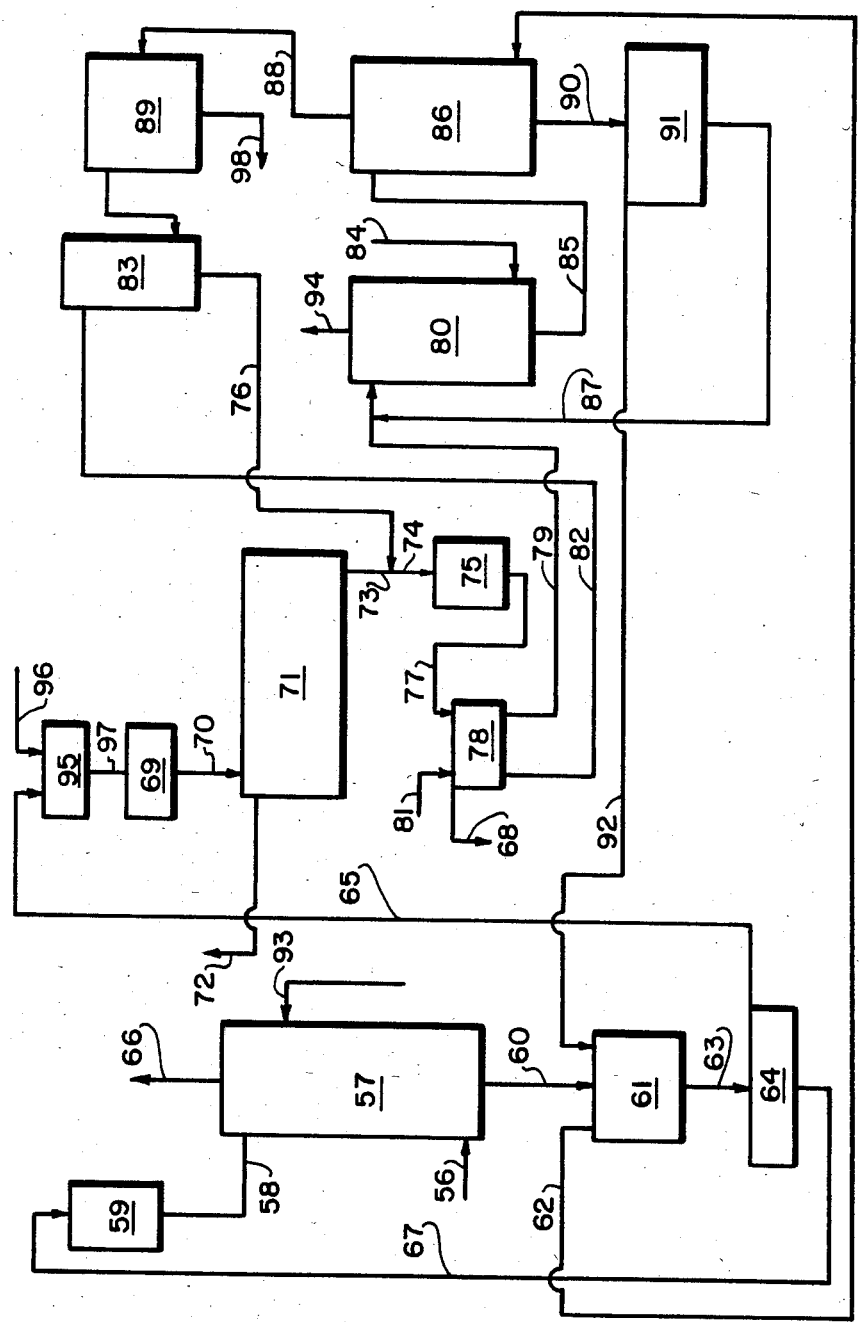

FIG. 2 depicts another variation of the invention which, in certain instances, has advantages compared with the variation shown in FIG. I. In this variation, the formation of $Na_2CO_3$ is eliminated and $H_2S$ is obtained as a concentrated gas by reacting a concentrated solution of $Na_2S$ with a concentrated stream of $CO_2$ while simultaneously forming solid $NaHCO_3$.

As described below, in the variation of the invention shown in FIG. 2 the principal steps are represented in (e) Equipment items 56 through 68 represent the absorption of $SO_2$ and the regeneration of the absorbent liquid;

(f) Equipment items 69 through 79 and items 81, 95, 96 and 97 represent the reduction of $Na_2SO_3$ to $Na_2S$ and the removal of ash from the process;

(g) Equipment items 82 and 83 show the recovery of $H_2S$ contained in the gas leaving the Claus process unit.

(h) Equipment items 80 through 89 and item 98 show the formation of solid $NaHCO_3$, the evolution of $H_2S$ and its conversion to sulfur in the Claus process unit; and (i) Equipment items 90 through 97 show the separation of solid $NaHCO_3$, its recycling and the circulation of the $NaHCO_3$ solution.

DETAILED DESCRIPTION

The invention will be understood by studying each step starting with the sulfur compound as it enters the process as sulfur dioxide, leaves as gaseous hydrogen sulfide in concentrated form and, in this instance, is converted to sulfur while the tail gas from the sulfur production operation is recycled to the process. It is convenient to show the application of the invention to the flue gas emanating from a large power plant burning high ash, high sulfur, low cost bituminous coal. The hot $SO_2$-containing flue gas with its particulates largely removed flows through duct (1) into absorption tower (2). A substantially saturated cool solution of $Na_2SO_3$ is pumped into the top inlet of the absorption tower by means of pipe (3) which is connected to absorption tower feed tank (4). The absorption tower is packed with any suitable internals since a clear solution flows downward through the tower counter-current to the upward flowing gas. As the gas and liquid contact each other $SO_2$ is absorbed, heat is exchanged and water is vaporized. The out-going gas leaves by way of outlet duct (5), saturated and its temperature reduced. Enough water is pumped into the tower by means of pipe (6A) to insure that salt does not crystallize within the tower.

In most instances the incoming gas will be at a temperature between 280° F. and 320° F. after it passes through an air preheater after leaving the steam raising unit. The gas leaving the absorber will be at a temperature several degrees above the temperature it would have been at if it had been contacted with water rather than the saturated $Na_2SO_3$ solution. This is due to the boiling point rise of the absorbent because of its high salt concentration.

For illustrative purposes it is convenient to have the incoming $Na_2SO_3$ solution contain about 330 parts of $Na_2SO_3$ dissolved in 1,000 parts of water. $Na_2SO_3$ has its maximum solubility in water at a temperature close to 35° C. (95% F.). Its solubility decreases as the temperature increases as well as decreases. As the solution flows downwards and absorbs $SO_2$ an increasing percentage of the dissolved $Na_2SO_3$ is converted to $Na_2S_2O_5$. $Na_2S_2O_5$ is much more soluble in water than $Na_2SO_3$. The pH of a concentrated solution of $Na_2SO_3$ is close to 10. If 70% of the $Na_2SO_3$ is converted to $Na_2S_2O_5$, the solution will still have a pH above 5. In a typical instance, a solution with the above composition can dissolve about 114 parts of $SO_2$ without any solid coming out of solution.

Should there be a small amount of particulates in the gas entering the tower, they will be wetted by the solution and captured by the solution in the tower's lower section. They will not reach any part of the tower's internals to cause clogging or scaling. Their presence in the outgoing solution will not cause any problems in succeeding steps for reasons explained below.

The rich or pregnant solution leaves the absorption tower by way of pipe (6) connected to heat exchanger (7). The ability to recover energy from the warm outgoing solution is an attribute to the invention, since such energy can be readily recovered. In this instance, the warm solution flowing through heat exchanger (7) is cooled while heating condensate entering by way of pipe (8) and leaving by means of pipe (9). The warmed condensate is returned to the boiler through the usual sequence of heat exchangers and economizer. The result is more of the energy in the fuel is obtained as high pressure steam.

An undesirable reaction takes place in the absorption tower—i.e. the oxidation of $Na_2SO_3$ to $Na_2SO_4$. Because the absorption solution is so concentrated, the solubility of oxygen in the solution is small so that the extent of this oxidation is smaller than it would be if the solution were less concentrated. The principal undesirable result of the formation of $Na_2SO_4$ is that it increases the consumption of reducing agent which in this example is bituminous coal. The concentration of $Na_2SO_4$ cannot build up appreciably as explained below. The cooled, pregnant solution leaves heat exchanger (7) by means of pipe (10) and flows into $Na_2SO_3$ precipitation vessel (11). Precipitation vessel (11) is also fed by means of belt conveyor (12) with a concentrated slurry or filter cake of $Na_2CO_3$. In the precipitation vessel Reaction B takes place, solid $Na_2SO_3$ precipitates and $CO_2$ is evolved. $CO_2$ leaves by way of duct (13). Since the initial solution flowing into the absorption tower is saturated or the equivalent of being saturated with $Na_2SO_3$, forming additional $Na_2SO_3$ causes the additional $Na_2SO_3$ to precipitate. The temperature at which the precipitation takes place is controlled so that the temperature is never below about 35° C. (95° F.). This prevents hydrated $Na_2SO_3$ from precipitating. When the $Na_2SO_3$ precipitates, it drags down any solid particulates that may be suspended in the solution thereby eliminating the particulates as a cource of operating problems. The amount of $Na_2CO_3$ added is regulated so that a mole of $Na_2CO_3$ is fed for each mole of $SO_2$ that has been absorbed. Because the solution contains a much larger concentration of $Na_2SO_3$ than $Na_2SO_4$ the $Na_2SO_3$ salts out $Na_2SO_4$ when its concentration in the solution exceeds about 7%.

The slurry of $Na_2SO_3$ suspended in its mother liquor leaves the precipitation vessel by means of pipe (14) which is the feed line to filter (15). In some instances a centrifuge will be preferable to a filter. It is desirable to obtain as dry a filter cake as is economically feasible. The filtrate leaves the filter by way of piping (16) which returns it to feed tank (4). By means of this one simple step, the spent absorbent solution is regenerated.

The filter cake of $Na_2SO_3$ containing any captured particulates and $Na_2SO_4$ is moved by means of conveyor belt (17) to mixer-pelletizer (18). This is also fed with ground bituminous coal by way of conveyor (19). A compacted, intimate mixture of coal and sodium sulfite and sulfate leaves the mixer-pelletizer and is fed by means of screw conveyor (20) to ported, controlled atmosphere rotary reactor (21) such as supplied by the Allis-Chalmers Corporation. This type of reactor can be operated under pressure and is equipped so that air and fuel can be supplied to any desired location along the kiln's length. The atmosphere can be controlled to be either reducing or oxidizing. Temperatures in excess of 1600° F. are easily obtained.

In the reactor the mixture is subjected to a reducing atmosphere at a temperature of about 1500° F. for about sixty minutes. As a rough rule of thumb, about one pound of the low cost coal burned in the power plant's boiler is fed to the reactor for every pound of $SO_2$ absorbed. In the reactor coal reacts with a controlled amount of air and sodium sulfite and sodium sulfate to form solid $Na_2S$ and hot products of combustion. The hot gas leaving the reactor is passed through duct (54) into a waste heat boiler not shown where any CO in the gas is burned and by product steam is produced.

The solid mixture formed in reactor (21) consisting of $Na_2S$ and the ash initially in the coal passes through two rotary gas locks so operated that solids can leave the kiln's discharge breeching while preventing the ingress of air. This prevents reoxidation of the hot $Na_2S$. The solid mixture after passing through the rotary locks passes downward in duct (52) into $Na_2S$ dissolving vessel (23). Wash liquor from filter (24) also flows into $Na_2S$ dissolving vessel (23) by means of pipe (25). A hot, concentrated solution of $Na_2S$ is formed in vessel (23) in which the ash components from the coal are suspended. This slurry flows from vessel (23) by means of pipe (53) to filter (24). The concentrated, solids-free filtrate leaves the filter by way of pipe (55). Water from pipe (27) washes the ash on the filter and quantitatively recovers the $Na_2S$ solution wetting the ash. The wash liquor is kept separate from the concentrated filtrate. As shown, the wash liquor added to the $Na_2S$ dissolving vessel by means of piping (25) and is used to dissolve solid, hot $Na_2S$ formed in the controlled atmosphere reactor (21).

Proceeding in this manner has several non-obvious advantages. Low cost coal always has a high ash content. An ash content of 16% to 20% is not unusual. Eliminating the ash at this step prevents it from building up in the recycle streams and it is accomplished by the introduction of a small amount of water. It is possible to form a hot, concentrated solution containing 55% dissolved $Na_2S$. Thus, only about a pound of water is fed to the process for every pound of $Na_2S$ formed. The hot, concentrated solution is formed without having to expend additional energy. The $Na_2S$ is at a high temperature when added to the dissolving vessel and the dissolution of $Na_2S$ in water is appreciably exothermic. Introduction of the water in this fashion not only allows the ash to be eliminated from the process immediately, it also simplifies the next step. The washed ash leaves filter (24) by conveyor belt (28). It is subsequently placed in a land-fill. Should it contain unburnt coal, it can be fed to the boiler and subsequently recovered as dry ash. In this way the unburnt coal is not wasted.

The bulk of the $Na_2S$ filtrate flows by way of pipe (55) into pipe (29) and enters reactor (30). Reactor (30) is also fed with $NaHCO_3$ filter cake by belt conveyor (31). Reactor (30) is preferably a stationary, horizontal, jacketed, cylindrical vessel equipped with a motor driven, internal, horizontal shaft to which adjustable paddles are fixed at about 6" to 8" intervals. The reactor has openings at the feed end for the introduction of solids, slurries and liquids. The discharge end has a lower opening for the discharge of solids or slurries. Depending upon the processing required the reactor can have a gas discharge opening at any location along its length. In this instance the gas opening is at about the reactor's center.

By rotating the paddles at a controlled rate and adjusting them so that the incoming feed is quickly moved towards the discharge end and adjusting the paddles close to the discharge end so that material is caused to move backwards, the residence period within the reactor is readily controlled. When $Na_2S$ and $Na_2HCO_3$ react to form $H_2S$ and $Na_2CO_3$ there is practically no heat of reaction. The feed $Na_2S$ solution is hot as mentioned above. The $NaHCO_3$ filter cake is relatively cool. The overall temperature within the reactor will be at about 105° C. (221° F.), the boiling point of a saturated $Na_2CO_3$ solution. This step in the process is carried out so that the $Na_2CO_3$ formed is obtained as a concentrated slurry suspended in a saturated solution of $Na_2CO_3$.

The two feed materials are intimately mixed by the rapidly rotating paddles. Steam at a pressure of 100 to 150 pounds per square inch is supplied to the jacket to impart any additional heat needed and to speed the reaction. About one half pound of water is vaporized per pound of $H_2S$. The mixed vapor leaves the reactor through the upper opening of the reactor. It flows by way of pipe (32) to a condenser not shown where most of the water is condensed and separated. The $H_2S$ flows into Claus unit (33) by a continuation of pipe (32). Sulfur is formed in the Claus unit and flows from the Claus unit into molten sulfur storage not shown by way of steamjacketed pipe (34). The tail gas from the Claus unit flows by way of piping (35) into scrubber (36). By means of pipe (37), Na₂S solution feeds scrubber (36). The Na₂S solution absorbs the H₂S in the tail gas forming a solution of NaHS and Na₂S. The H₂S-free gas leaves the scrubber through stack (38). The solution formed in scrubber (36) passes through pipe (39) into pipe (29) and becomes part of the feed to reactor (30). The concentrated slurry formed in reactor (30) leaves the reactor and is divided into equal quantities. One half is conveyed by conveyor belt (12) to vessel (11). The other half is moved by conveyor belt (40) to dissolving vessel (41). Dissolving vessel (41) is also fed by a saturated solution of NaHCO₃. The quantities are adjusted so that the mixture formed in dissolving vessel (41) is a solution composed of about 12% Na₂CO₃ in which nearly an equal amount of solid NaHCO₃ is suspended. The suspension flows from dissolving vessel (41) to carbonation tower (42) by way of pipe (43). A small part of the suspension is diverted to carbonation tower (45) by way of pipe (44). Carbonation tower (42) is also fed with the CO₂ evolved in vessel (11) by means of duct (13). Flue gas from any convenient source not shown enters carbonation tower (45) by piping (46).

In both carbonation towers Na₂CO₃ is converted to NaHCO₃. As the Na₂CO₃ concentration diminishes, the concentration of NaHCO₃ in the solution increases. The bulk of the Na₂CO₃ is converted to NaHCO₃ so that the slurry leaving both carbonation towers consists of solid NaHCO₃ suspended in a solution containing a small amount of dissolved, unconverted Na₂CO₃ and saturated with NaHCO₃. The concentration of Na₂CO₃ in the solution is in the range 1% to 4% and that of NaHCO₃ 10% to 12%. These are typical ranges when the temperature of the mixture in the towers is about 105° F. The reaction of H₂O, CO₂ and Na₂CO₃ to form Na₂CO₃ is exothermic. Heat is removed by means of cooling coils within the carbonation towers.

Two carbonation towers are shown primarily for illustrative purposes. Although most of the required CO₂ is obtained from Na₂SO₃ precipitation vessel (11), it cannot be readily quantitatively recovered. The smaller carbonation tower (45) shows how the small amount of make-up CO₂ can be easily obtained. In practice, a tall carbonation tower is used. Concentrated CO₂ from vessel (11) is introduced through a bottom inlet. Flue gas from a convenient source is introduced about midway between the bottom and top of the tower. The sodium carbonate solution and its suspended NaHCO₃ are fed into the tower's top inlet. The small amount of make-up CO₂ is obtained from the flue gas contacting a relatively strong Na₂CO₃ solution.

Returning to the flow-diagram, slurry from the two carbonation towers is fed to filter feed tank (47) by means of piping (48). Slurry at a controlled rate is pumped to filter (49) by means of pipe (50). Solid, moist NaHCO₃ filter cake is taken from filter (49) and transported to reactor (30) by means of conveyor belt (31). The filtrate from filter (49) is recycled to Na₂CO₃ dissolving vessel (41) by piping (51).

The manner employed to react Na₂S with NaHCO₃ described above is novel and possesses a variety of advantages. The mixing of the reactants takes place quickly, and perfectly without requiring auxiliary equipment. Moreover, the solution of Na₂S which is obtained at a temperature close to 140° C., well above its freezing point of about 90° C., supplies a large part of the heat needed to have the reacting mixture be at a temperature at which the H₂S evolves quickly.

The constant agitation in the reactor insures that the bicarbonate in the solution will quickly react with the sulfide in solution. As the bicarbonate in solution is depleted, the constant agitation enables the liquid to quickly dissolve additional solid bicarbonate in the mixture. By maintaining a narrow clearance between the paddles and the interior surface of the reactor while preventing the mixture from going to dryness, good heat transfer is insured. The violent stirring of the mixture by the action of the moving paddles prevents gaseous H₂S from being trapped within the outgoing slurry.

It was pointed out above that NO₂ is also absorbed by the alkaline sulfite solution. The NO₂ is converted to sodium nitrite and sodium nitrate. The amount of each depends on the extent of the oxidation of the NO in the absorption step. The small amount of these salts which are formed are thermally decomposed in the reducing kiln and harmless, elemental nitrogen is released.

As mentioned, the ash contained in the coal is separated on the filter and disposed of in a land-fill. In some instances it will be desirable to use an excess of coal to insure substantial completion of the reduction step. When operating in this mode the ash on the filter will be mixed with the excess coal. This fuel value can be recovered by mixing the washed solids with coal fed to the boiler. The ash will then be recovered as part of the ash recovered from the boiler.

A variation of the above process enables H₂S to be recovered from SO₂ removed from gas mixtures of which it is a part using less costly equipment than required in the process described above. It employs two reactions—in unique ways so that exceptional economies with respect to both equipment and operating cost are obtained. The two reactions are:

$$Na_2S_2O_5 + 2NaHCO_3 = 2Na_2SO_3 + H_2O + 2CO_2 \quad \quad J$$

$$Na_2S + 2H_2O + 2CO_2 = H_2S + 2NaHCO_3 \quad \quad K$$

This variation of the invention is depicted in FIG. 2. The SO₂-containing gas flows through duct (56) into SO₂ absorption tower (57) and out stack (66). A solution saturated with Na₂SO₃ flows into absorption tower (57) through feed pipe (58) connected to feed tank (59). SO₂ is absorbed by the Na₂SO₃-containing solution to form dissolved Na₂S₂O₅. Enough water is pumped into tower (51) through pipe (93) to prevent material coming out of solution. The spent or pregnant solution leaving tower (57) flows through pipe (60) into precipitation vessel (61). The solution contains a high concentration of dissolved Na₂S₂O₅ and an appreciable amount of dissolved Na₂SO₃. Such a solution typically will contain per 1,000 parts of water 338 parts of Na₂S₂O₅ and 106 parts of Na₂SO₃. A moist filter cake of NaHCO₃ is also fed by way of conveyor belt (92) to precipitation vessel (61). The amount of NaHCO₃ fed is just enough to react with the Na₂S₂O₅ to form Na₂SO₃ and CO₂. The CO₂ leaves the precipitation vessel through duct (62). The concentration of the Na₂S₂O₅ and Na₂SO₃ in the solution fed to the precipitation vessel are controlled so that substantially all of the Na₂SO₃ formed by the addition of the NaHCO₃ precipitates. The slurry formed in precipitation vessel (61) is fed by means of pipe (63) to filter (64). By means of the filter, solid Na₂SO₃ is separated from the Na₂SO₃ solution in which it was suspended. Enough of the solution and all of the solid are transferred by belt conveyor (65) to mixer (95) so that the total amount of Na₂SO₃ transferred is equivalent to the amount of $SO_2$ removed from the flue gas and the water balance maintained. The filtrate obtained in filtration step is pumped through pipe (67) to feed tank (59). Mixer (95) is also fed with bituminous coal by screw conveyor (96). The blend formed in the mixer is transferred by belt conveyor (97) to pelletizer (69). The pellets leaving the pelletizer drop into chute (70) which enters the feeder not shown that controls the rate of addition of the pellets to controlled atmosphere reactor (71). Air at a controlled rate is also fed to controlled atmosphere reactor (71) in which the $Na_2SO_3$ is reduced to $Na_2S$. The gaseous mixture formed in the reactor leaves the reactor by way of duct (72) which conducts the mixture to a waste heat boiler not shown. In the waste heat boiler any combustibles in the gas are burned and steam is produced. The solid $Na_2S$ formed in the reactor along with ash from the coal consumed and any unburnt coal leave the reactor by means of rotary locks not shown. The hot solids are transferred by water-cooled screw conveyor (73) to chute (74) that empties into dissolving vessel (75). Dissolving vessel (75) also receives a dilute solution of $Na_2S$ and $NaHS$ by way of pipe (76). A concentrated solution of $Na_2S$ is formed in the dissolving vessel. The water insoluble solids are suspended in the solution. The slurry is pumped through pipe (77) to belt filter (78). The solids-free concentrated $Na_2S$ solution leaves the filter and is pumped by means of pipe (79) to carbonation tower (80). Water from pipe (81) washes the solids on the filter. The washed solids are moved by conveyor belt (68) to a land fill. The wash liquor forms a dilute $Na_2S$ solution. The wash liquor is kept separate from the concentrated $Na_2S$ solution. The dilute wash liquor leaves the filter and is pumped through pipe (82) into $H_2S$ absorber (83). Carbonation tower (80) is also fed by means of duct (84) with flue gas from any convenient source. $CO_2$ is absorbed from the flue gas. It reacts with $Na_2S$ and water to form $NaHS$ and $NaHCO_3$. The amount of $CO_2$ absorbed is controlled to be equal to the amount required for make up purposes. The balance of the flue gas leaves by way of stack (94). Carbonation tower (80) is also fed a cool solution of $NaHCO_3$ by means of pipe (87). The solution leaving carbonation tower (80) contains an increased amount of $NaHS$ and dissolved $NaHCO_3$. If $CO_2$ losses are appreciable, some solid $NaHCO_3$ will also form in carbonation tower (80). The underflow from tower (80) is pumped through pipe (85) to carbonation tower (86). Carbonation tower (86) is also fed through duct (62) with the concentrated $CO_2$ gas evolved in precipitation vessel (61). In carbonation tower (86) the sulfide in the solution is reacted with a slight excess of $CO_2$ so that the solution leaving the tower is substantially sulfide-free. The reactions taking place in the carbonation tower are reaction K and the reaction of $NaHS$ with $H_2O$ and $CO_2$ to form $NaHCO_3 + H_2S$. The concentration of $Na_2S$ in the carbonation tower is adjusted by the controlled addition of the saturated solution of $NaHCO_3$ so that solid $NaHCO_3$ is formed and the outgoing slurry contains about 10% solid $NaHCO_3$ by weight. The $H_2S$ formed plus a slight excess of $CO_2$ leaves the carbonation tower's top outlet and flows through duct (88) to Claus process unit (89).

The outgoing slurry leaves carbonation tower by pipe (90) which is the feed pipe to an evaporative cooler not shown and to filter (91). $NaHCO_3$ filter cake obtained on filter (91) is transferred to precipitation vessel (61) by means of belt conveyor (92). To maintain the water balance of the process, since water is introduced in the ash washing step, the slurry passing through pipe (90) is fed to an evaporative cooler not shown where water is flashed off, the slurry cooled, and cooled slurry enters a continuation of pipe (90). The NaHCO solution leaving filter (91) flows through pipe (87) to tower (80).

The preceding description shows how ash may be eliminated from the process by dissolving the $Na_2S$ in a minimum amount of water and filtering the resultant concentrated solution. Using this procedure requires that an amount of water be added to the process equal to the weight of sodium sulfide dissolved. The same result can be achieved by adding a lesser amount of water. In fact, the amount of water which leaves the process in this portion of the process is more than is required to eliminate the ash. It will be noted from Reaction K that two moles of water are consumed for each mole of $Na_2S$ converted to $H_2S$ and $NaHCO_3$. Secondly, by cooling the slurry leaving the carbonation step by evaporative cooling, water is removed from the process. In a typical instance half a pound or more of water will be vaporized and removed from the process in this operation for every pound of $H_2S$ formed. Thirdly, in the step in which solid $NaHCO_3$ is separated from the slurry that leaves the evaporative cooler, a filter cake is obtained. This filter cake will contain about one tenth of a pound of water for each pound of solid. The total of this amount of water is available for washing the insoluble ash. To use this water for this purpose the solid $Na_2S$ and its accompanying ash is mixed with all or a fraction of the cool $NaHCO_3$ filtrate as well as wash liquor whose origin is described below. A solution is formed containing dissolved $Na_2S$ and dissolved $NaHCO_3$ in which the ash particles are suspended. The resulting slurry is filtered and the filtrate pumped to the carbonation step. The insoluble ash is then washed free from $NaHCO_3$ and $Na_2S$ with warm wash water. The wash liquor is kept separate from the filtrate. It can then be employed to absorb $H_2S$ and then used in the $Na_2S$ dissolving step.

To speed the carbonation of the $Na_2S$ it is preferable to compress the $CO_2$ leaving precipitation vessel (61) and carry out the carbonation in tower (86) at a pressure in the range of 2 to 4 atmospheres.

The carbonation reaction is exothermic. To keep the temperature of the slurry in the carbonation tower below about 45° C. at the tower's bottom outlet, the saturated $NaHCO_3$ solution is cooled before it is recycled. It is sometimes useful to equip the carbonation towers with interior cooling coils or the equivalent. One alternative is to withdraw slurry from several different levels in the carbonation tower, pass the slurry through a heat exchanger and return the cooled slurry to the tower.

The concentration of $H_2S$ in the gas to be fed to a Claus process unit has an important influence on the unit's first cost. The higher the $H_2S$ concentration in the feed, the lower the required capital investment and the lower the operating cost. This is the reason emphasis has been placed on the concentration of the recovered $H_2S$. Recovering concentrated $H_2S$ economically is a substantial advantage of this invention.

It is emphasized that a distinguishing feature of this invention is that it can be practiced without requiring the consumption of fuel for the purpose of evaporating water to regenerate the absorbent. To achieve this condition the spent or pregnant absorbent solution leaving the $SO_2$-absorbent step must be sufficiently concentrated with respect to sodium pyrosulfite and sodium sulfite that upon the addition of solid sodium carbonate or solid sodium bicarbonate, solid sodium sulfite precipitates. This condition can be attained even if the sodium sulfite containing absorbent is relatively dilute providing water is evaporated during the flue gas contacting step. This happens in many instances. In all of the claims it is to be understood that the above criterion is met.

In summary, then, this invention provides a substantially improved process for the recovery of the sulfur values and the energy from an $SO_2$-containing flue gas while simultaneously purifying it so that it may be exhausted to the atmosphere as an acceptably clean and harmless effluent. Variations can be employed with respect to procedures and proportions without changing the scope of the invention as defined by the following claims:

What is claimed is:

1. A regenerable process for the removal of sulfur dioxide from a gas in which it is contained and its subsequent recovery as hydrogen sulfide as a concentrated gas, said process comprising the steps of:
   (a) contacting said gas with a recycled, aqueous, alkaline reaction medium containing a high concentration of dissolved sodium sulfite to react the bulk of the sulfur dioxide with sodium sulfite to form a reaction medium containing dissolved sodium pyrosulfite and sodium sulfite, said recycled, alkaline reaction medium being supplied from the separated solution obtained in step (d);
   (b) adding, in the substantial absence of air, sufficient sodium carbonate formed in step (g) to the reaction medium formed in step (a) to react with the dissolved sodium pyrosulfite to form a slurry of solid sodium sulfite suspended in the resulting aqueous, alkaline reaction medium and concentrated, gaseous carbon dioxide;
   (c) separating the concentrated, gaseous carbon dioxide and recycling it to step (i);
   (d) separating solid sodium sulfite from the aqueous, alkaline reaction medium and recycling said reaction medium to step (a);
   (e) reducing the separated sodium sulfite to sodium sulfide;
   (f) mixing the sodium sulfide formed in step (e) with water;
   (g) reacting, in the substantial absence of air, the sodium sulfide contained in the mixture formed in step (f) with particles of solid sodium bicarbonate from step (j) at a temperature sufficiently high to form a slurry of solid sodium carbonate suspended in a saturated sodium carbonate solution and a gas mixture consisting primarily of water vapor and hydrogen sulfide and recovering the hydrogen sulfide;
   (h) recycling part of the solid sodium carbonate formed in step (g) to step (b);
   (i) adding the remainder of the sodium carbonate formed in step (g) to a saturated sodium bicarbonate solution and carbonating the resulting mixture with carbon dioxide formed in step (b) to form a slurry of solid particles of sodium bicarbonate dispersed in said solution; and
   (j) separating particles of sodium bicarbonate from the slurry formed in step (i) and recycling said separated particles to step (g).

2. The process of claim (1) in which the reducing agent used in step (e) is an ash-containing solid.

3. The process of claim (2) in which the sodium sulfide formed in step (e) is dissolved in sufficient water to form a concentrated solution of sodium sulfide in which ash particles are suspended, separating said ash particles from the sodium sulfide solution and the separated sodium sulfide solution fed to step (g).

4. The process of claim (1) in which step (b) is carried out above a temperature of 35° C. (95° F.).

5. A regenerable process for the removal of sulfur dioxide from a gas in which it is contained and its subsequent recovery as hydrogen sulfide as a concentrated gas, said process comprising the steps of:
   (a) contacting said gas with a recycled, aqueous, alkaline reaction medium containing a high concentration of dissolved sodium sulfite to react the bulk of the sulfur dioxide with sodium sulfite to form a reaction medium containing dissolved sodium pyrosulfite and sodium sulfite, said recycled, alkaline reaction medium being supplied from the separated solution obtained in step (d);
   (b) adding, in the substantial absence of air, sufficient sodium bicarbonate formed, in step (f) to the reaction medium formed in step (a) to react with the dissolved sodium pyrosulfute to form a slurry of solid sodium sulfite suspended in the resulting aqueous, alkaline reaction medium and concentrated, gaseous carbon dioxide;
   (c) separating the concentrated, gaseous carbon dioxide and recycling it to step (f);
   (d) separating solid sodium sulfite from the aqueous, alkaline reaction medium and recycling said separated reaction medium to step (a);
   (e) reducing the separated sodium sulfite to sodium sulfide;
   (f) adding the sodium sulfide formed in step (e) to an aqueous, sodium bicarbonate-containing reaction medium and, in the substantial absence of air, carbonating the resulting mixture with the concentrated gaseous carbon dioxide formed in step (b) to form a slurry of solid particles of sodium bicarbonate dispersed in the aqueous, sodium bicarbonate-containing reaction medium along with a gas composed primarily of water vapor and hydrogen sulfide and recovering the hydrogen sulfide;
   (g) separating from the slurry formed in step (f) particles of sodium bicarbonate from the aqueous sodium bicarbonate-containing reaction medium and recycling said separated reaction medium to step (f); and
   (h) recycling the separated particles of sodium bicarbonate formed in step (f) to step (b).

6. The process of claim (5) in which the reducing agent used in step (e) is an ash-containing solid.

7. The process of claim (6) in which the sodium sulfide formed in step (e) is dissolved in a sodium bicarbonate-containing reaction medium in which ash particles are suspended, separating said ash particles from the sodium sulfide-containing reaction medium and feeding the separated sodium sulfide-containing medium to step (f).

8. The process of claim (5) in which step (b) is carried out above a temperature of 35° C. (95° F.).

9. A regenerable process for both the removal of heat and it partial recovery and the removal of sulfur dioxide and its subsequent recovery as a concentrated hydrogen sulfide gas from a sulfur dioxide-containing gas which is at an elevated temperature, said process comprising the steps of:

(a) directly contacting said gas with a recycled, aqueous, alkaline reaction medium containing a high concentration of dissolved sodium sulfite whose temperature is less than that of said gas whereby the temperature of the gas is reduced and the bulk of the sulfur dioxide reacts with sodium sulfite to form a reaction medium containing dissolved sodium pyrosulfite and sodium sulfite, the temperature of the sodium pyrosulfite-containing reaction being medium greater than that of the recycled reaction medium, said recycled reaction medium being supplied from the separated solution obtained in step (e);

(b) passing the sodium pyrosulfite-containing reaction medium formed in step (a) in indirect heat exchange with a cooler fluid so that heat is added to the cooler fluid and thereby recovered and heat removed from said pyrosulfite-containing reaction medium;

(c) adding sufficient, in the substantial absence of air, solid sodium carbonate formed in step (h) to the cooled sodium pyrosulfite-containing reaction medium obtained from step (b) to react with the dissolved sodium pyrosulfite to form a slurry of solid sodium sulfite suspended in the resulting aqueous, alkaline reaction medium containing a high concentration of sodium sulfite and concentrated, gaseous carbon dioxide;

(d) separating the concentrated, gaseous carbon dioxide and feeding it to step (j);

(e) separating solid sodium sulfite from the aqueous, alkaline, reaction medium containing a high concentration of sodium sulfite and recycling said reaction medium to step (a);

(f) reducing the separated sodium sulfite to sodium sulfide;

(g) mixing the sodium sulfide formed in step (f) with water;

(h) reacting, in the substantial absence of air, the sodium sulfide contained in the mixture formed in step (g) with particles of solid sodium bicarbonate from step (k) at a temperature sufficiently high to form a slurry of solid sodium carbonate suspended in a saturated sodium carbonate solution and a gas consisting primarily of water vapor and hydrogen sulfide and recovering the hydrogen sulfide;

(i) recycling part of the sodium carbonate formed in step (h) to step (c);

(j) adding the remainder of the sodium carbonate formed in step (h) to a substantially saturated sodium bicarbonate solution and carbonating the resulting mixture with carbon dioxide formed in step (c) to form a mixture of solid particles of sodium bicarbonate dispersed in said solution;

(k) separating particles of solid sodium bicarbonate from the mixture formed in step (j) and recycling the remainder of the mixture to step (j); and (l) recycling the separated particles of solid sodium bicarbonate to step (h).

10. A regenerable process for both the removal of heat and its partial recovery and the removal of sulfur dioxide and its subsequent recovery as a concentrated hydrogen sulfide gas from a sulfur dioxide-containing gas which is at an elevated temperature, said process comprising the steps of:

(a) directly contacting said gas with a recycled, aqueous, alkaline reaction medium containing a high concentration of dissolved sodium sulfite whose temperature is less than that of said gas whereby the temperature of the gas is reduced and the bulk of the sulfur dioxide reacts with sodium sulfite to form a reaction medium containing dissolved sodium pyrosulfite and sodium sulfite, the temperature of the sodium pyrosulfite-containing reaction medium being greater than that of the recycled reaction medium, said recycled reaction medium being supplied from the separated solution obtained in step (e);

(b) passing the sodium pyrosulfite-containing reaction medium formed in step (a) in indirect heat exchange with a cooler fluid so that heat is added to said cooler fluid and thereby recovered and heat removed from said pyrosulfite-containing reaction medium;

(c) adding sufficient, in the substantial absence of air, solid sodium bicarbonate formed in step (g) to the cooled sodium pyrosulfite-containing reaction medium obtained from step (b) to react with the dissolved sodium pyrosulfite to form a slurry of solid sodium sulfite suspended in the resulting aqueous, alkaline reaction medium containing a high concentration of sodium sulfite and concentrated, gaseous carbon dioxide;

(d) separating the concentrated, gaseous carbon dioxide and feeding it to step (g);

(e) separating solid sodium sulfite from the aqueous, alkaline reaction medium containing a high concentration of sodium sulfite and recycling said separated reaction medium to step (a);

(f) reducing the separated sodium sulfite to sodium sulfide;

(g) adding the sodium sulfide formed in step (f) to an aqueous, sodium bicarbonate-containing reaction medium and, in the substantial absence of air, carbonating the resulting mixture with the concentrated gaseous carbon dioxide formed in step (c) to form a slurry of solid particles of sodium bicarbonate dispersed in the aqueous, sodium bicarbonate-containing reaction medium along with a gas composed primarily of water vapor and hydrogen sulfide and recovering the hydrogen sulfide;

(h) separating from the slurry formed in step (g) particles of solid sodium bicarbonate from the aqueous, sodium bicarbonate-containing reaction medium of recycling said separated reaction medium to step (g); and (i) recycling the separated, solid particles of sodium bicarbonate formed in step (g) to step (c).

* * * * *